(12) United States Patent
Elovici et al.

(10) Patent No.: US 12,126,635 B2
(45) Date of Patent: Oct. 22, 2024

(54) BIO-INSPIRED AGILE CYBER-SECURITY ASSURANCE FRAMEWORK

(71) Applicants: B. G. NEGEV TECHNOLOGIES & APPLICATIONS LTD., AT BEN-GURION, Beer Sheva (IL); NANYANG TECHNOLOGICAL UNIVERSITY, Singapore (SG)

(72) Inventors: Yuval Elovici, D.N. Lachish (IL); Rami Puzis, Ashdod (IL); Polina Zilberman, Eshkolot (IL); Elad Marco, Beer Sheva (IL); Aviad Elitzur, Sderot (IL); Thambipillai Srikanthan, Nanyang (SG); Anupam Chattopadhyay, Nanyang (SG); Siew Kei Lam, Nanyang (SG); Jawad Haj-Yahya, Nanyang (SG)

(73) Assignees: B.G. NEGEV TECHNOLOGIES AND APPLICATIONS LTD., AT BEN-GURION UNIVERSITY (IL); NANYANG UNIVERSITY (SG)

(*) Notice: Subject to any disclaimer, the term of this patent is extended or adjusted under 35 U.S.C. 154(b) by 1006 days.

(21) Appl. No.: 17/041,316

(22) PCT Filed: Mar. 25, 2019

(86) PCT No.: PCT/IL2019/050331
§ 371 (c)(1),
(2) Date: Sep. 24, 2020

(87) PCT Pub. No.: WO2019/186535
PCT Pub. Date: Oct. 3, 2019

(65) Prior Publication Data
US 2021/0084061 A1    Mar. 18, 2021

(30) Foreign Application Priority Data
Mar. 25, 2018 (IL) .......................... 258345

(51) Int. Cl.
*H04L 9/40* (2022.01)
*G06F 9/445* (2018.01)

(52) U.S. Cl.
CPC ...... *H04L 63/1425* (2013.01); *G06F 9/44526* (2013.01); *H04L 2463/146* (2013.01)

(58) Field of Classification Search
CPC ............. H04L 63/1425; H04L 63/1433; H04L 63/145; H04L 63/1416; H04L 63/1408;
(Continued)

(56) References Cited

U.S. PATENT DOCUMENTS 9,245,114 B2 *  1/2016  Thomas ................. G06F 3/0679
10,079,842 B1 *  9/2018  Brandwine ......... H04L 63/1441
(Continued)

FOREIGN PATENT DOCUMENTS

| CN | 106411921 | 2/2017 |
|---|---|---|
| EP | 2026527 | 2/2009 |

OTHER PUBLICATIONS

"A network gene-based framework for detecting advanced persistent threats" 2014 19th Intl Conf. pp. 97-102.
(Continued)

*Primary Examiner* — Hosuk Song
(74) *Attorney, Agent, or Firm* — Clark Hill PLC; James R. Foley

(57) ABSTRACT

A framework for efficiently and automatically exploring a data network and accurately identifying network threats, which comprises a plurality of software and hardware-based agents, distributed over the data network. The agents are capable of adjusting or reconfiguring, on the fly, the behavior of the agents and their ability to collect data in a targeted manner, so as to investigate suspicious incidents and alerts and collect data that was not yet collected by the system; collecting forensic data by executing tasks defined in workflows, being distributed threat intercepting programs and reporting about the collected forensic data, back to a Central Control Unit (C&C). Distributed threat intercepting programs ("workflows") are used to provide instructions to agents, to perform branching and provide instructions to the Central Control Unit (C&C), which orchestrates the agents to assure proper execution of the workflows; analyzes the collected information and presents ongoing status to an operator supervising the data network.

21 Claims, 7 Drawing Sheets

(58) Field of Classification Search
CPC .............. H04L 63/14; H04L 2463/146; G06F 9/44526
See application file for complete search history.

(56) References Cited

U.S. PATENT DOCUMENTS

| | | | |
|---|---|---|---|
| 10,762,201 B2* | 9/2020 | Noeth | G06F 21/567 |
| 10,868,818 B1* | 12/2020 | Rathor | H04L 67/75 |
| 11,494,216 B2* | 11/2022 | Halcrow | G06F 21/566 |
| 11,698,963 B2* | 7/2023 | Noeth | H04L 63/1408 |
| | | | 726/23 |
| 2008/0028323 A1* | 1/2008 | Rosen | G06Q 10/10 |
| | | | 715/752 |
| 2008/0244694 A1 | 10/2008 | Neystadt et al. | |
| 2014/0165207 A1 | 6/2014 | Engel et al. | |
| 2014/0201836 A1 | 7/2014 | Amsler | |
| 2018/0004941 A1 | 1/2018 | Reinecke et al. | |

OTHER PUBLICATIONS

"Data processing for intrusion detection system using swarm intelligence techniques" Intl Journal of Computer Applications, 975:8887, Aug. 31, 2013.

* cited by examiner

```
def main():
    iocs = [['FileObjectType', 'Avtask.exe'], ['FileObjectType', 'Ws.exe'],
        ['FileObjectType', 'Alg.exe'], ['FileObjectType', 'Tiersvc.exe'],
        ['FileObjectType', 'Svchost.exe'], ['FileObjectType', '104.dll'],
        ['FileObjectType', 'Haslo.dat'], ['FileObjectType', 'Haslo.exe'],
        ['FileObjectType', 'D2.exe'], ['FileObjectType', 'Swprv.exe'],
        ['FileObjectType', 'Dos.exe'], ['FileObjectType', 'Opc.exe'],
        ['FileObjectType', '61850.exe'], ['FileObjectType', 'defragsvc.exe'],
        ['FileObjectType', 'port.exe'], ['FileObjectType', 'Aabdul']]

# create a new policy based on the given IOCs, assigned to the agent and enforce
    create_and_enforce_policy(iocs)

# Splunk functionality
    alert_num = 0
    splunkClient.create_alert(alert_num, iocs)
    logger.info("An alert was defined. The container will be notified of any IOCs found by ePO.")
    communicator.bind_handlers_to_alert(alert_num, get_results)
    logger.info('The alert was bound to the get_results handler')

if __name__ == "__main__":
    main()
```

Fig. 2

```
agent_name = u'AGENT1' def create_and_enforce_policy(iocs):
    policy = epoClient.create_policy(iocs)
    logger.info("Policy based on the IOCs was created successfully..")
    epoClient.import_policy(policy)
    logger.info("Policy was imported to the ePO Policies Catalog")

policy_properties = epoClient.get_policy_properties()
    policy_properties = policy_properties[0]
    epoClient.assign_policy_to_system(agent_name, policy_properties['productId'],
                        str(policy_properties['typeId']),
str(policy_properties['objectId']))
    logger.info("Policy was assigned to the agent")

epoClient.enforce_policies_using_wakeup_agent(agent_name)
    logger.info("Policy is now enforced at the agent!")

def search_network_artifacts():
    logger.info("Searching for network artifacts...")
    network_iocs = [['AddressObjectType', '195.16.88.6'], ['AddressObjectType', '46.28.200.132'],
            ['AddressObjectType', '188.42.253.43'], ['AddressObjectType', '5.39.218.152'],
            ['AddressObjectType', '93.115.27.57']]

# create a new policy based on the given IOCs, assigned to the agent and enforce
    create_and_enforce_policy(network_iocs)
    splunkClient.create_alert(alert_num, network_iocs)
    logger.info("An alert was defined. The container will be notified of any IOCs found by ePO.")

def get_results(**content):
    results = splunkClient.get_splunk_results(content['sid'])
    logger.info('The following IOCs were found:')
    for ioc_type, observable in results.items():
        logger.info('Type: {0}, Value: {1}'.format(ioc_type, observable))
    search_network_artifacts()
```

Fig. 3

BIO-INSPIRED AGILE CYBER-SECURITY ASSURANCE FRAMEWORK

This application is a National Phase Filing of PCT/IL2019/050331, having an International filing date of Mar. 25, 2019, which claims priority of Israel Patent Application No. 258345, having a filing date of Mar. 25, 2018. The disclosure of the foregoing are hereby incorporated by reference.

FIELD OF THE INVENTION

The present invention relates to the field of cyber security. More particularly, the invention relates to an automatic process for efficiently exploring a data network and accurately identifying network threats.

BACKGROUND OF THE INVENTION

Computer networks are widely spread almost in any organization, in order to facilitate fast and efficient data exchange between connected computers within the network and within other remote networks. However, these networks are vulnerable to potential cyber-attacks, which are linked both to organized crime and to terrorism, and they inflict substantial economic damage.

In recent years, the initiators of cyber-attacks play a dynamic "cat and mouse" game with those trying to stop them. Preventing a particular kind of a cyber-attack does not mean that the hackers give up, but merely that they change their tactics. They are constantly look for new victims, new attack vectors (paths or means by which a hacker can gain access to a computer or network server in order to deliver a payload or malicious outcome. Attack vectors enable hackers to exploit system vulnerabilities, including the human element), and new exploits (attacks on a computer system that take advantage of a particular vulnerability the system offers to intruders).

Current attack industry has established methodologies of research, development, and execution of new attacks including attacks with the highest level of sophistication, known as "Advanced Persistent Threats" (APTs). The U.S. National Institute of Standards and Technology (NIST), defines APT as "an adversary that possesses sophisticated levels of expertise and significant resources which allow it to create opportunities to achieve its objectives by using multiple attack vectors (e.g., cyber, physical, and deception). These objectives typically include establishing/extending footholds within the information technology infrastructure of the targeted organizations for purposes of information exfiltration, undermining or impeding critical aspects of a mission, program, or organization; or positioning itself to carry out these objectives in the future. The advanced persistent threat: (i) pursues its objectives repeatedly over an extended period of time; (ii) adapts to defenders' efforts to resist it; and (iii) is determined to maintain the level of interaction needed to execute its objectives."

In legacy Intrusion Detection Systems (IDSs), all sensors are pre-coded to collect specific data which is always collected, regardless the current state of investigation. Legacy IDSs optimize the set of sensors that need to be present in the system, in order to collect the most valuable information, on one hand, and avoid overloading the organizational resources, on the other hand.

State-of-the-art security solutions employ sophisticated adaptive machine learning algorithms, in order to learn the normal state of the system and detect outliers. However, this solution is insufficient, since it is focused on anomaly detection.

It is a common observation during post-factum investigations that "the writing was on the wall" in a sense that data collected by the sensors contained clues to the attack. However, with absence of strong indicators which would confirm these clues, they usually do not pass the IDS alert filtering algorithms (that are intended to reduce false-positive alerts), since they are too vague. Also, existing IDSs try to reduce the number of false alerts through analysis of the data already collected by the sensors, and are not sufficiently updated.

It is therefore an object of the present invention to provide a framework that automatically finds support for vague clues of attacks, contained in collected sensor data, based on descriptions of past attacks.

It is another object of the present invention to provide a framework that automatically reconfigures the sensors to collect data in a more targeted manner.

It is a further object of the present invention, to provide a framework that automatically collects data that was not yet collected.

It is yet another object of the present invention to provide a framework that is able to effectively detect low-signature APTs.

Other objects and advantages of the invention will become apparent as the description proceeds.

SUMMARY OF THE INVENTION

A framework for efficiently and automatically exploring a data network and accurately identifying network threats, which comprises:
 a) a plurality of software and hardware-based agents, distributed over the data network, and being capable of:
  a.1) adjusting or reconfiguring, on the fly, the behavior of the agents and their ability to collect data in a targeted manner, so as to investigate suspicious incidents and alerts and collect data that was not yet collected by the system;
  a.2) collecting forensic data by executing tasks defined in workflows, being distributed threat intercepting programs;
  a.3) reporting about the collected forensic data, back to a Central Control Unit (C&C);
 b) distributed threat intercepting programs ("workflows") which comprise:
  b.2.i) instructions to agents;
  b.2.ii) branches;
  b.2.iii) instructions to the C&C;
 c) a Central Control Unit (C&C) for:
  c.1) orchestrating the agents to assure proper execution of the workflows;
  c.2) analyzing the collected information; and
  c.3) presenting ongoing status to an operator supervising the data network.

The framework according may further comprise an Attack Hypotheses Generation module for generating a collection of attack hypotheses, by providing a set of known tools, malware types, and attack patterns that are used by an attacker, and having the highest probability during an investigated incident.

The framework according may further comprise a Workflow Generation module for adapting threat intercepting procedures to the latest threat intelligence obtained from external sources, or to the likeliest attack hypotheses generated by the Attack Hypotheses Generation module.

The agents may adapt their behavior to the emerging threats by executing instructions of different workflows.

In one aspect, the framework comprises at least one processor for adjusting workflows, based on a combination of Attack Hypotheses Generation and Workflows Generation, the adjusted workflows effectively react to emerging threats in the data network.

In one aspect, the workflows are created according to the following steps:
a) creating initial workflows are by a domain expert, based on relevant up-to-date threat information, for executing tasks such as monitoring of the network, detecting anomalies, identifying required forensic data, or performing any other designated tasks;
b) creating subsequent workflows for detecting previously unknown and undiscovered APTs, being mutations of previously known APTs, by employing the Attack Hypotheses Generation and the Workflow Generation modules; and
c) using newly found APTs to extend the pool of, from which further mutations will be created.

The agents may be configured to execute multiple tasks, depending on inspected threat.

The workflows may include control operators such as loops and decision points, where one of a few possible steps is to be chosen.

Tasks of a workflow may be distributed to different agents, for optimizing one or more of the following criteria:
time efficiency;
balanced CPU consumption;
network traffic consumption.

Different parts (tasks, instructions) of a workflow may be executed by different agents.

The agents may be configured to participate in various workflows in parallel, serially, or at a specific time or context as determined by a workflow execution plan.

Workflows may be represented using Python programming language and executed using RestrictedPython, in order to reduce the risk of exploits.

The agents may be commercial of the shelf products.

In one aspect, the collected data may be partially processed by the agents locally, and the results are transferred to a central repository for deeper analysis The framework may further comprise Security Information and Event Management (SIEM) product, which stores the data collected by the agents and executes a set of correlation, aggregation, and analysis rules defined in the workflows.

In one aspect, multi-step attacks are handled by collecting and correlating forensic information from different locations in the network.

In one aspect, following the detection of an anomaly, anomalous events are investigated by executing relevant workflows, so as to collect forensic data, validate the event, and track down the attack path.

Software agents may be installed on PCs and servers across the organization and secured hardware agents are connected to communication switches of the organization's network.

The agents may be deployed independently using a "plug-and-play" mode, or be installed on existing machines of the organization.

The framework may further comprise cyber security plug-ins (e.g., anomaly detection, IDS rules, Signatures, Blacklists) for detecting IOCs defined in attack descriptions.

The switch may be configured by the Trusted Monitoring Orchestration module, to mirror only specific selected traffic.

BRIEF DESCRIPTION OF THE DRAWINGS

In the drawings:
FIG. 2 illustrates a Workflow implementation example for a 'main' function, according to an embodiment of the invention;
FIG. 3 is a Workflow implementation example of the functions that are called from the 'main' function, according to an embodiment of the invention.

DETAILED DESCRIPTION OF PREFERRED EMBODIMENTS

Figure 1:
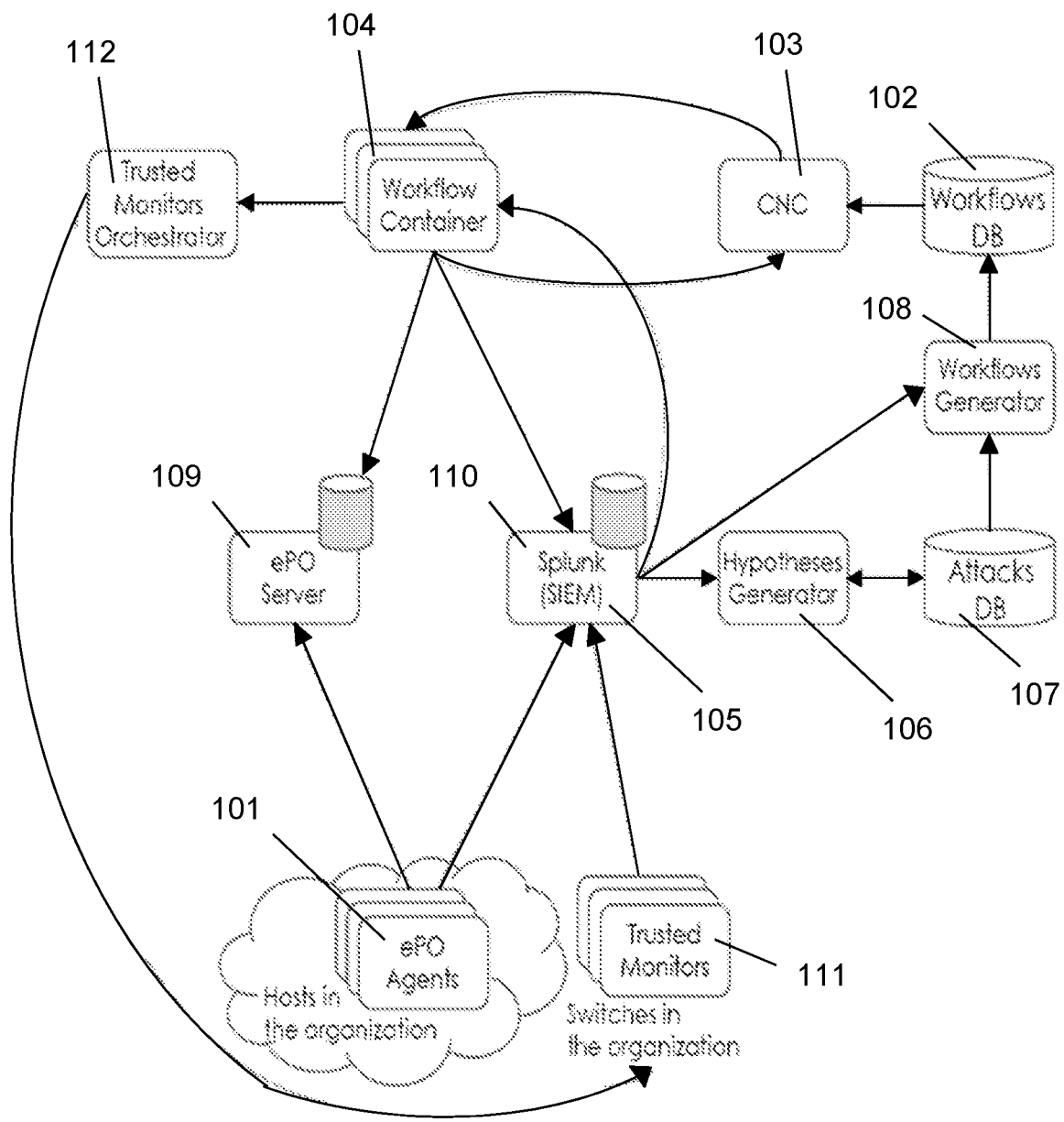
FIG. 1 illustrates the proposed Framework's High-Level Architecture, according to an embodiment of the invention.

The present invention proposes a Bio-Inspired Cyber Security Assurance Framework (BICSAF) that addresses the dynamic (ever-changing) threat landscape and the need for continuous endless forensic investigation which adapts to the current state of the organization and state of the art threats. The proposed framework (a framework is a layered structure indicating what kind of programs can or should be built and how they would interrelate. Some computer system frameworks also include actual programs, specify programming interfaces, or offer programming tools for using the frameworks) introduces two components that increase the level of automation during forensic investigations and assist the security officers during strategic decision making.

An Attack Hypotheses Generation module of the BICSAF provides a set of tools, malware, and attack patterns that are used by the attacker with the highest probability during the investigated incident.

The Workflow Generation module of the BICSAF provides the security officers/analysts with ready-to-execute distributed threat intercepting programs (termed "workflows") which provide instructions to agents, branching (creating copies of programs or objects in development to work in parallel versions, retaining the original and working on the branch or making different changes to each. Each copy is considered a branch. Branching is used in version control and software management to maintain stability while isolated changes are made to code. Branching facilitates the development of bug fixes, the addition of new capabilities and the integration of new versions after they have been tested in isolation) and instructions to the C&C.

The BICSAF reconfigures the distributed sensors to collect data in a more targeted manner, so as to investigate suspicious alerts and collect data that was not yet collected by the system.

The BICSAF consists of a Central Control unit (termed C&C) and multiple agents deployed throughout the network. Inspired by bio-systems, agents are able to adjust their behavior on the fly, while intercepting for forensic information related to sophisticated cyber-attacks. Several software and secure processor-based agents (termed as 'hardware' agents) have been developed and connected into the existing network that requires protection, in various places of the network. The software agents can be installed on PCs and servers across the organization and hardened secured hardware agents can be connected to communication switches. The agents may be deployed independently in a "plug-and-play" fashion, as well as be installed on existing machines of the organization. Once the agents are in place, they execute tasks defined in the workflows. The C&C orchestrates the agents, assures proper execution of the workflows, analyzes the collected information and presents the ongoing status to the operator (the system analyst). Special Workflow Generation module adapts the threat intercepting procedures either to the latest threat intelligence (organized, analyzed and refined information about potential or current attacks that threaten an organization) obtained from external sources (e.g. National Computer Emergency Response Team (CERT—an expert group that handles computer security incidents) or to the likeliest attack hypotheses generated by the Hypotheses Generation module. The combination of Attack Hypotheses Generation and Workflows Generation enables intelligent adjustment of workflows, which effectively react to emerging threats.

Instead of deploying task-oriented defense equipment in "strategic" points of the computer network in order to protect it from cyber-attacks, the protection strategy proposed by the present invention is inspired by biological organisms. According to this strategy, computerized systems do not possess one gatekeeper in order to protect themselves from viruses, just like bio organisms. Instead, a computerized system engages a network of protection agents, which are able to adapt their behavior to the emerging threats by executing different workflows, which are adapted to intercept APTs within the organizational environment.

The initial workflows can be hand-crafted by a domain expert, based on relevant up-to-date threat intelligence, in order to accomplish various tasks such as monitoring the network, detecting anomalies, identifying required forensic data, or performing any other designated tasks. The subsequent workflows are automatically generated by employing the Attack Hypotheses Generation and the Workflow Generation modules. The generated workflows will be used in order to investigate new, previously unknown and undiscovered APTs, which by themselves are in nature, evolutionary progressions and mutations of previously known APTs. Most APTs are built upon existing knowledge of the attackers, influenced by previous attacks. Any newly found APT will be used to extend the pool of threat intelligence, from which the mutations will be created.

Workflows define a set of operations to be executed by the agents. Such workflows include multiple tasks that need to be executed by the agents, depending on the inspected threat. Since workflows are (distributed) programs, they also include control operators, such as loops and decision points, where one of few possible steps should be chosen. Given such a workflow, it may be important to distribute the tasks to different agents, so as to optimize various criteria, such as time efficiency, balanced CPU consumption, network traffic consumption, etc. Agents may execute the various workflows in parallel, serially, or at a specific time or context, as determined by the workflow execution plan.

As an example, Python programming language is used to represent a workflow. Since workflows are automatically generated based on related data (attack models and indicators) imported from external sources, they cannot be trusted. Instead, in a possible embodiment, RestrictedPython is employed for execution of workflows in order to reduce the risk of exploits (attacks on a computer system, especially attacks that takes advantage of a particular vulnerability the system offers to intruders) provided in form of Indicators of Compromise (IOCs—which are pieces of forensic data, such as data found in system log entries or files, that identify potentially malicious activity on a system or network, or other attack model elements) or other attack model elements.

In a possible embodiment, BICSAF uses existing tools developed by market leaders, rather than developing tailor-made software in-house for every function which is not the innovation core of the proposed framework. In a possible embodiment, McAfee ePolicy Orchestrator (McAfee ePO a scalable centralized security management software that unify security management through an open platform, to make risk and compliance management simpler and more successful for organizations of all sizes) is used. Collected data is partially processed by the agents in place and the results are transferred to a central repository for deeper analysis. In this embodiment, Splunk (a software platform to search, analyze and visualize the machine-generated data gathered from the websites, applications, sensors, devices etc., which make up IT infrastructure and business) is used as the Security Information and Event Management (STEM—software products and services that combine Security Information Management (SIM) and Security Event Management (SEM) to provide real-time analysis of security alerts generated by applications and network hardware) module (product) which provides big-data management capabilities, as well as a set of correlation, aggregation, and analysis rules. The result of the analysis of collected forensic information includes alerts on suspected attacks.

BICSAF may include various cyber security plug-ins, such as anomaly detection, IDS rules, signatures, blacklists, etc. These plug-ins are used to detect IOCs defined in attack descriptions. BICSAF employs a new approach for automating the forensic analysis that is usually performed by human security analysts. Moreover, multi-step attacks are considered by collecting and correlating forensic information from different locations in the network. Following detection of an anomaly, which can be performed also by commercially available off-the-shelf components (COTS), anomalous events are investigated by executing relevant workflows. The purpose of these workflows is to collect forensic data, validate the event, and track down the attack path.

FIG. 1 illustrates the proposed Framework's High-Level Architecture, according to an embodiment of the invention. The proposed framework engages a network of protection agents 101, which are able to adapt their behavior to the emerging threats by executing workflows that are stored in workflow database (WorkflowsDB) 102. The unit that is responsible for managing workflows is the Command and Control Unit (C&C) 103 that is managed directly by the administrator. The C&C 103 retrieves workflows from the WorkflowsDB 102 and starts a separate process of a workflow-container 104 for each workflow. The C&C 103 is responsible for: storing predefined workflows, maintaining metadata about workflows in progress, receiving notifications from the workflow-containers 104 about workflow's completion of investigation and the existence of forensic findings in the SIEM 105.

The Hypotheses Generator module 106 generates attack descriptions (hypotheses) based on known attacks given in the AttacksDB 107 and the current state of the system, as represented by forensic evidence that has been already collected. The Workflows Generator module 108 retrieves "machine-consumable" attacks representations and generate workflows that intercept these attacks in the system.

In a possible embodiment of the invention, McAfee ePolicy Orchestrator 109 (McAfee ePO) is utilized as the software agents' infrastructure.

The hardware agents (a hardware agent is a trusted application that runs on a secure processor, which is a processor that is embedded in a packaging with multiple physical and software security measures and does not output decrypted data or decrypted program instructions in an environment where security cannot always be maintained) are responsible for executing the trusted monitoring, i.e., they collect network traffic, using port-mirroring (sending a copy of network packets seen on one switch port to a network monitoring connection on another switch port) at the switch, and look for differentiations from the traffic monitored at the software agents. In this way, stealthy malware is detected and the system is being self-monitored: the agents themselves validate each other's health state.

Collected data is partially processed locally by the agents and the results are transferred to a central repository, for deeper analysis.

The purpose of workflows is to collect forensic data, validate the event, and track down the attack path. Workflows define a set of operations to be executed by the agents and include multiple tasks that should be executed by the agents, depending on the threat in question. Since workflows are (distributed) programs, they also include control operators such as loops and decision points, where one of a few possible steps is to be chosen. Given such a workflow, it may be important to distribute the tasks to different agents, so as to optimize various criteria, such as time efficiency, or balanced CPU consumption, network traffic consumption, etc. Agents may execute the various workflows in parallel, serially, or at a specific time or context, as determined by the workflow execution plan.

Workflow-Container

The C&C starts a separate process of workflow-container 104 for each workflow that should be executed. The workflow-container receives from the C&C a workflow and is responsible for:
 1. Executing the workflow in a secure mode.
 2. Linking the workflow commands with the agents' orchestrator and the SIEM.
 3. Returning the workflow's final execution status to the C&C.

The workflow-container 104 prevents the workflow from directly accessing the C&C and the Application Program Interfaces (APIs—a code that allows two software programs to communicate with each other) provided by the agents' orchestrator and the SIEM. Instead it wraps the direct access to C&C, agents' orchestrator and the SIEM. In a possible embodiment of the invention, it is implemented using the following components:
 1. cnc_api which is responsible for the communication with the C&C.
 2. epo_api which is responsible for the communication with the agents' orchestrator (e.g. ePO server).
 3. splunk_api and splunk_listener which are responsible for the communication with the SIEM (e.g. Splunk).

The above mentioned components provide the following 'building blocks' for the designer of a workflow:
 4. Running tasks and activating policies at specific hosts 71 via an interface to the agents' orchestrator supplied by the workflow-container module.
 5. Defining rules for the SIEM to launch (alerts).
 6. Defining handlers to alerts activated by the SIEM.

McAfee ePolicy Orchestrator (ePO)

One possible embodiment of current invention may employ ePO 109 as the data collection infrastructure (the agents' infrastructure and agents' orchestrator). The potential product should do the following:
 1. Support dynamic deployment of tasks on the software agents.
 2. Support deploying specific tasks on specific agents.
 3. Support deploying customized tasks on the agents.
 4. Supply a variety of products to employ as tasks.
 5. Provide built-in security assurance.

ePO Server

The ePO server 109 is responsible for managing the ePO agents and distributing tasks (executables) and policies (rules) from the workflow-container 104 to the ePO agents. The ePO server 109 is also responsible for forwarding data collected by the ePO agents 101 to the Splunk server 110.

The ePO server 109 should comply with the following requirements:
 1. Manage the set of ePO agents 101 in the system's network.
 2. Maintain the features (such as OS, IP address, etc.) of the hosts on which the ePO agents are deployed.
 3. Distribute policies and tasks delivered from the workflow-container 104.
 a) Assign policies and tasks to ePO agents 101 according to given characteristics.
 b) Forward results to the Splunk server 110.

ePO Agent

The ePO Agent software runs on a single physical machine which is part of the system's network. The ePO server 109 and agents' infrastructure provides the following:
 1. Agents collect features from the local machines.
 2. Secure communication between the ePO agents and the ePO server 109, secure assignment of tasks and policies, and secure data collection.
 3. Local (on the agent) data storage and processing.
 4. Optimized performance of the agents and scalability in the number of tasks to be executed on an agent.
 5. Capability of installing and removing tasks during run time on specific agents.
 6. Communication between the ePO server 109 and the ePO agents 101.
 7. Tasks distribution by the ePO server to the ePO agents.
 8. Data collection at the ePO server 109.
 9. Resilience of the ePO agents 101 and server 109.

Splunk

One possible embodiment of current invention may employ Splunk as the Security Information and Event Management (SIEM) product. Splunk is an off-the-shelf STEM product (https://www.splunk.com/). The SIEM component 110 is responsible for receiving data created by tasks and collected according to policies executed by the agents on the hosts. In a possible embodiment where ePO and Splunk are employed, data generated as a result of McAfee's tasks and policies is first sent to the ePO server. Then Splunk collects the data from the ePO server 109. In a possible embodiment that uses Splunk the following APIs (supplied by Splunk) are used:

1. An API for the automatic execution of search queries over the collected data.
2. An API for the automatic definition of rules that will alert the workflow-container 104 upon a specific accumulation of data (and delegation of the alert notifications to the alert handlers at the workflow-container).

Splunk, as a potential SIEM product, provides the framework with:
1. Big data management capabilities.
2. Correlation, aggregation, and analysis of data according to automatically defined rules.
3. Resilience.

Attack Hypotheses Generation

The Hypotheses Generator 106 is responsible for the generation of attack hypotheses (attack descriptions). The primary objective of this module is generating viable attack hypotheses. Ontological rules will define what a viable hypothesis is. The basic building blocks will be taken from existing cyber-attack ontology.

The secondary objectives are twofold (achieved through various fitness functions applied during the selection operation). First, the generated attack hypotheses should have high likelihood of being performed (at present or in the past) in the investigated network. Second, the generated attack hypotheses should lead the forensic investigator to artifacts that were not yet discovered (i.e., that are not in the SIEM 110).

The attack should be described in a format which is both human-readable and machine-consumable, i.e., that security systems could "understand" this description. The description must by structured, with well-defined hierarchy and also well-defined terminology and taxonomy. Human readability means that security analysts should read the attack hypotheses, and derived new directions for their investigations or focus on specific direction.

One possible implementation of the module is through genetic algorithms. Then, the generation of viable attack hypotheses is achieved by: (1) selecting "individuals" from a dataset of known attacks, which are described using a uniform vocabulary, and (2) evolving them through series of crossover, mutation, and selection operations.

Workflow Generation

The Workflows Generator module 108 is responsible for the evidences acquisition logic. This module provides the automation of data collection regarding a given set of attacks hypotheses.

The Workflows Generator module 108 generates workflows, where each workflow contains a set of instructions regarding what data to search and where to search for it. The input to this module are attack hypotheses in a structured format that expresses Threat Intelligence (such as Structured Threat Information eXpression STIX format, which is a standardized XML programming language for conveying data about cybersecurity threats in a common language that can be easily understood by humans and security technologies). Each attack contains Indications Of Compromise (IOCs). IOCs are different types of data such as registry keys (organizational units in the Windows registry, an internal database the computer uses to store configuration information), file hashes (Calculated Hash functions to verify the integrity of files), etc. that if detected, could indicate that an attack is taking place. Using an optimization mechanism, a set of attacks is being translated to a set of instructions for data collection (that constitute an automatic forensic investigation), which eventually helps the system to determine the confidence of each hypothesis.

The main objective of the Workflows Generator module 108 is given a set of attacks hypotheses, to collect IOCs for the sake of confirmation of the existence of the attacks, while performing the collection in the most effective way. Obviously, it is not possible to search every IOC at every host. Hence, the Workflows Generator module 108 has to decide which IOCs to search first, at which stage, and where to search for them.

Trusted Monitoring and Trusted Monitoring Orchestration

Figure 7:
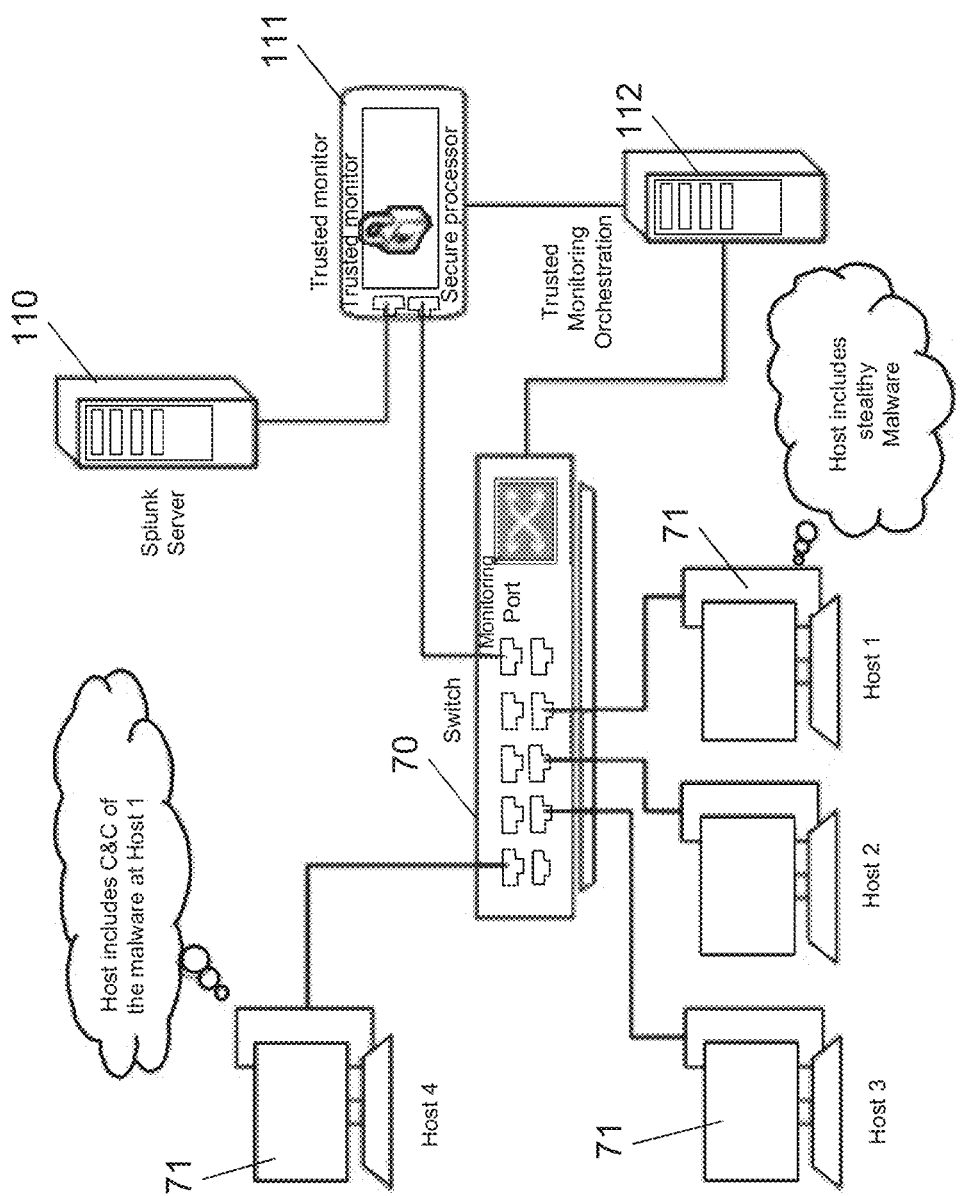
FIG. 7 illustrates a Trusted Monitoring framework, according to an embodiment of the invention.

Network monitoring and packet analyzer tools, such as Tcpdump (a packet analyzer that runs under the command line that allows the user to display TCP/IP and other packets being transmitted or received over a network), Wireshark (an open-source packet analyzer), Netstat (a network utility tool that displays network connections for finding problems in the network and to determine the amount of traffic on the network as a performance measurement), Nmap (an open-source network scanner, used to discover hosts and services on a computer network by sending packets and analyzing the responses); cannot be trusted. A stealthy malware has the capability to hide its traces from these tools while running on the host and communicating with the malware's C&C. Hence, a trusted monitoring mechanism that is being integrated into the BICSAF framework is built. The goal of the trusted monitoring is to determine the presence of such stealthy malware. The trusted monitoring mechanism consists of: a Secure Processor (not shown), Trusted Monitor modules 111 and Trusted Monitoring Orchestration 112, as shown in FIG. 7.

Customized Secure Processor

The Trusted Monitor software is running as Trusted Application at Customized Secure-Processor (Secure Hardware Agent). The Secure-Processor implements various features to protect against known attacks on the computing system hardware and the software that is running on it. The features include:

1. Secure IO and Secure Debug (to provide control of permissions for debug in secure User mode) to protect against various hardware treats such as Key Extraction (a secret key can be extracted if the debugging points for the hardware are not protected. The debugging points are pausing places in a program, put in place for debugging purposes), Illicit Debugging, Probing (an attempt to gain access to a computer and its files through a known or probable weak point in the computer system) and Side-Channel Attacks (SCA—attacks based on information gained from the implementation of a computer system).
2. Secure Boot, to protect against attacks such as: Image Hacking (a hacker can modify a JPEG file to consist of distorted information), Botnet Enrolling (a botnet is a collection of internet-connected devices, which may include PCs, servers, mobile devices and internet of things devices that are infected and controlled by a common type of malware) and Cold-Boot attack (in which threat actors recover data stored in RAM after a computer was improperly shut down).
3. Trusted-Execution Environment (TEE—a secure area of a main processor that guarantees code and data loaded inside to be protected with respect to confidentiality and integrity)—guarantees isolated execution environment for the trusted application, this feature is essential for protecting against attacks such as: Software Exploitation, Privilege Escalation and Botnet Enrolling.

4. Secure Storage—is an important feature that exists in secure processors in order to protect against Side-Channel Attacks (SCA), Probing and Key Extraction. In addition, it's used by the TEE to load and execute the trusted applications while protecting the code and data of the running applications.

In addition, the Secure-Processor has the following customized features that were added especially for the BICSAF framework:

1. Secure Disk Storage (a program that makes a part of a current hard disk to be a secure disk, where all private and confidential information stored on this disk will be protected by strong encryption), for recording, observation and analyzing of packets and sending statistics to the STEM.
2. Customizable crypto primitives (low-level cryptographic algorithms that are frequently used to build cryptographic protocols for computer security systems), such as, Elliptical Curve Cryptography (ECC— is a public key encryption technique based on elliptic curve theory that can be used to create efficient cryptographic keys), Elliptic Curve Digital Signature Algorithm (ECDSA—a Digital Signature Algorithm which uses elliptic curve cryptography), Advanced Encryption Standard (AES—a specification for the encryption of electronic data) and SHA3.
3. Prevention of software-based attacks (e.g., timing side-channel resistance against SCA).
4. Dynamic key loading by Physical Unclonable Function (PUF— a "digital fingerprint" that serves as a unique identity for a semiconductor device such as a microprocessor) or Hardware Secure Module (HSM—a physical computing device that safeguards and manages digital keys for strong authentication and provides cryptoprocessing) coupling.
5. Dual Ethernet ports, where the first is used for the Local Area Network (LAN) and the second it used for the streaming of the mirrored data from the Switch 70 into the Trusted-Monitor.

Trusted Monitor

A Trusted-Monitor 111 is software that runs on the Secure-Processor and monitors the network. In a possible embodiment of the invention, the device running the Trusted-Monitor 111 is connected via port mirroring to each access-point switch, as shown in FIG. 7. Thus, the Trusted-Monitor "overlooks" the outgoing traffic of all end-point hosts in the system. Potentially, a Trusted-Monitor is capable of monitoring the outgoing traffic of every host it is "overlooking" given the IP of the monitored host.

Trusted-Monitors are not affected by the presence of malware on the client (the Secure-Processor) that is running it. Specifically, a malware cannot manipulate operations on the Trusted-Monitor and it's communication with the Switch and the SIEM. Hence, the packets sent by the malware eventually appear on the Trusted-Monitor. When a stealthy malware communicates with its C&C, the Trusted-Monitor 111 will be able to detect the malware presence by observing the mirroring port (a physical post in the network switch which contains a replica of all data packets that pass via another port, for monitoring purposes). The difference between the packets that are captured on the Trusted-Monitor and the packets captured on the client terminal can extract the traffic that was seen on the Trusted-Monitor and was sent by the client terminal but was not seen on the client terminal itself. This difference is due to those packets that were sent by the stealthy malware while communicating with its C&C.

Trusted Monitoring Orchestration

The Trusted Monitoring Orchestration module 104 manages the activation of monitoring at the Trusted-Monitors. In a possible embodiment, the Trusted Monitoring Orchestration module 104 may configure the Switch to mirror only specific traffic. In addition, the Trusted Monitoring Orchestration module 104 configures the Trusted-Monitors by instructing what to monitor and what statistics to send up to the SIEM.

FIG. 2 illustrates a Workflow implementation example for a 'main' function, according to an embodiment of the invention. FIG. 3 is Workflow implementation example of the functions that are called from the 'main' function, according to an embodiment of the invention.

Figure 4:
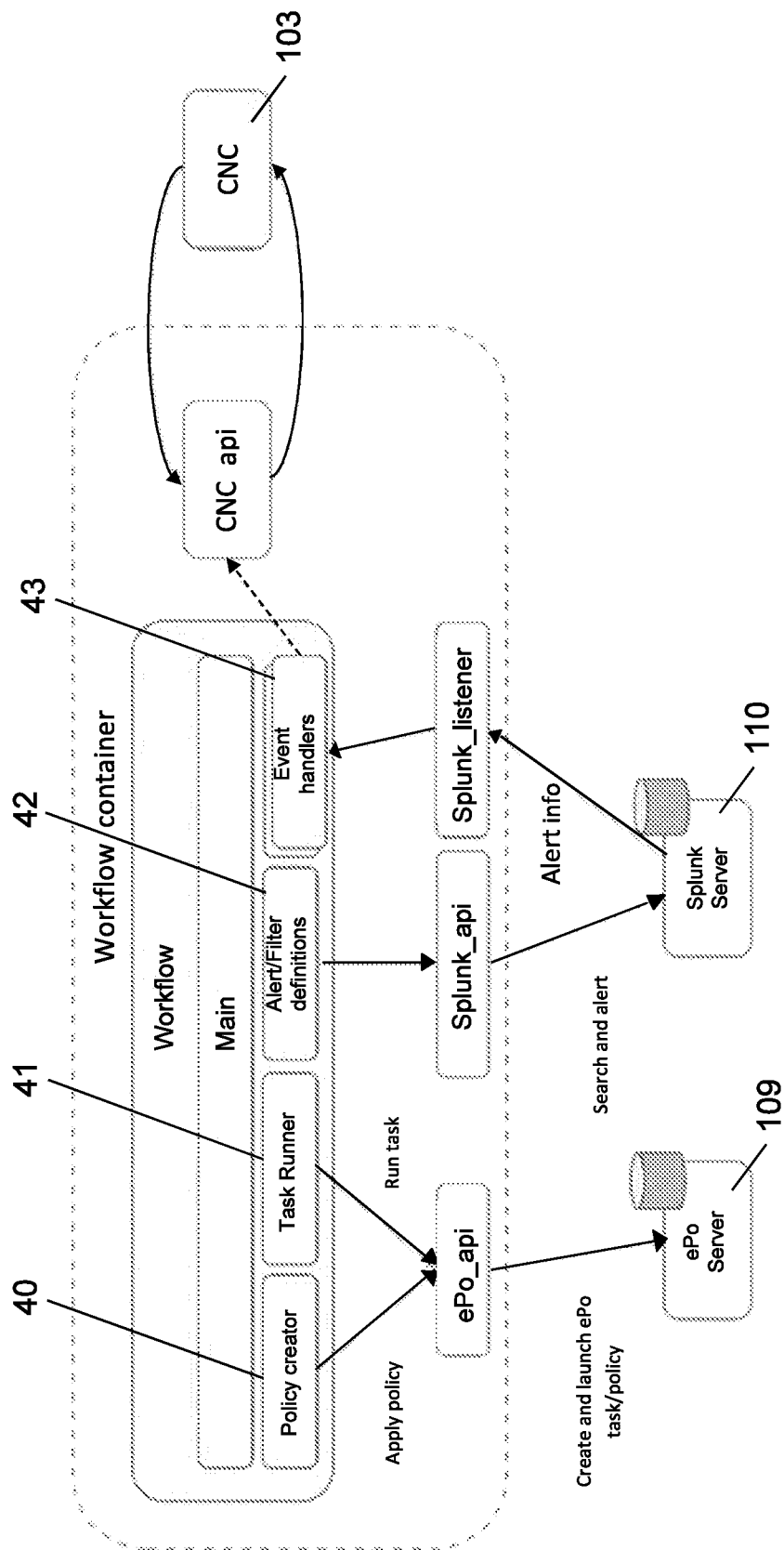
FIG. 4 illustrates workflow-container's High-Level Architecture, according to an embodiment of the invention.

FIG. 4 illustrates a high-level architecture of a workflow-container, according to an embodiment of the invention. The workflow container 104 includes a policy creator that applies a predetermined policy and a task runner 41 that runs tasks to be performed. Both of them create and lunch tasks and policy that are fed into the ePO server 109. An alert/filter definition module 42 provides search and alert instructions to the Splunk server 110. An event handler 43 listens to alert information provided by the Splunk server 110 and communicates with the Command and Control Unit (C&C) 103 in order to activate a responsive workflow.

Figure 5:
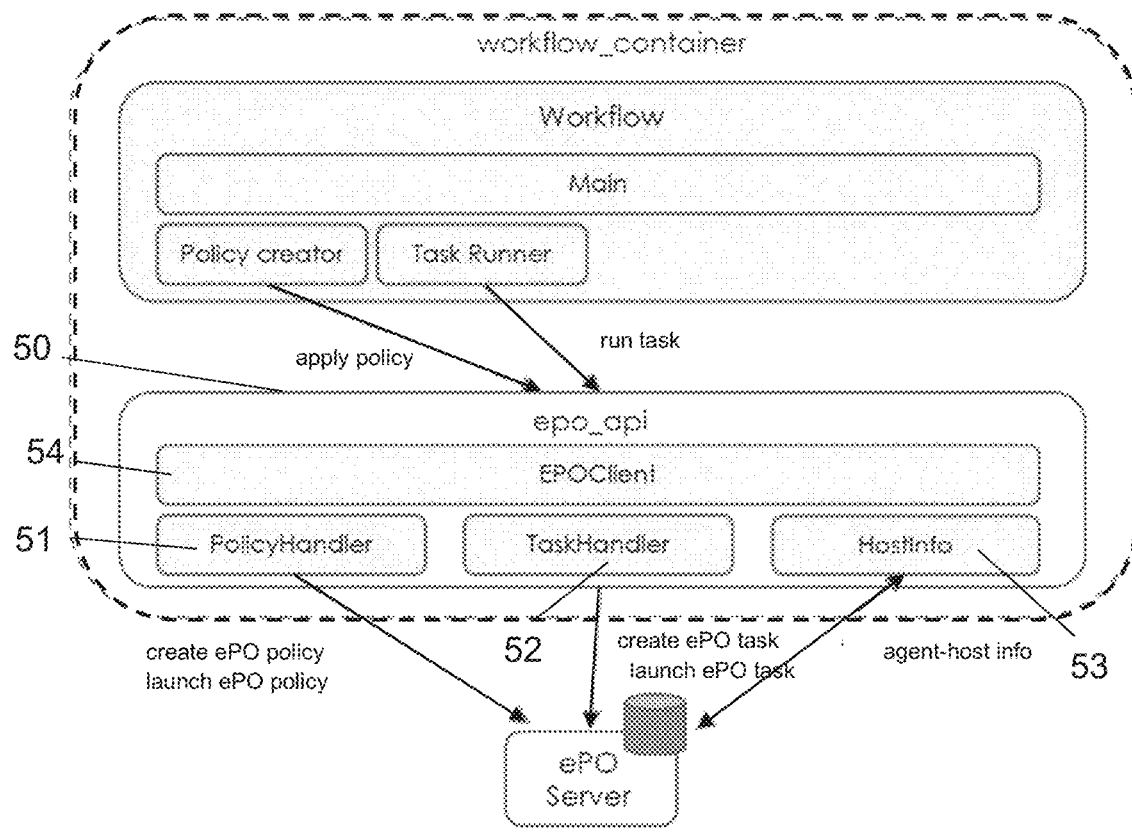
FIG. 5 illustrates the components for accessing agents' orchestrator, according to an embodiment of the invention.

FIG. 5 illustrates the components for accessing agents' orchestrator, according to an embodiment of the invention. The API 50 of the ePO server 109 comprises an ePO client 54, a policy handler 51 that creates and lunches the ePO policy, a task handler 52 for creating and lunching tasks for the ePO server 109 and a host-info module 53 for exchanging information regarding the host and agent with the ePO server.

Figure 6:
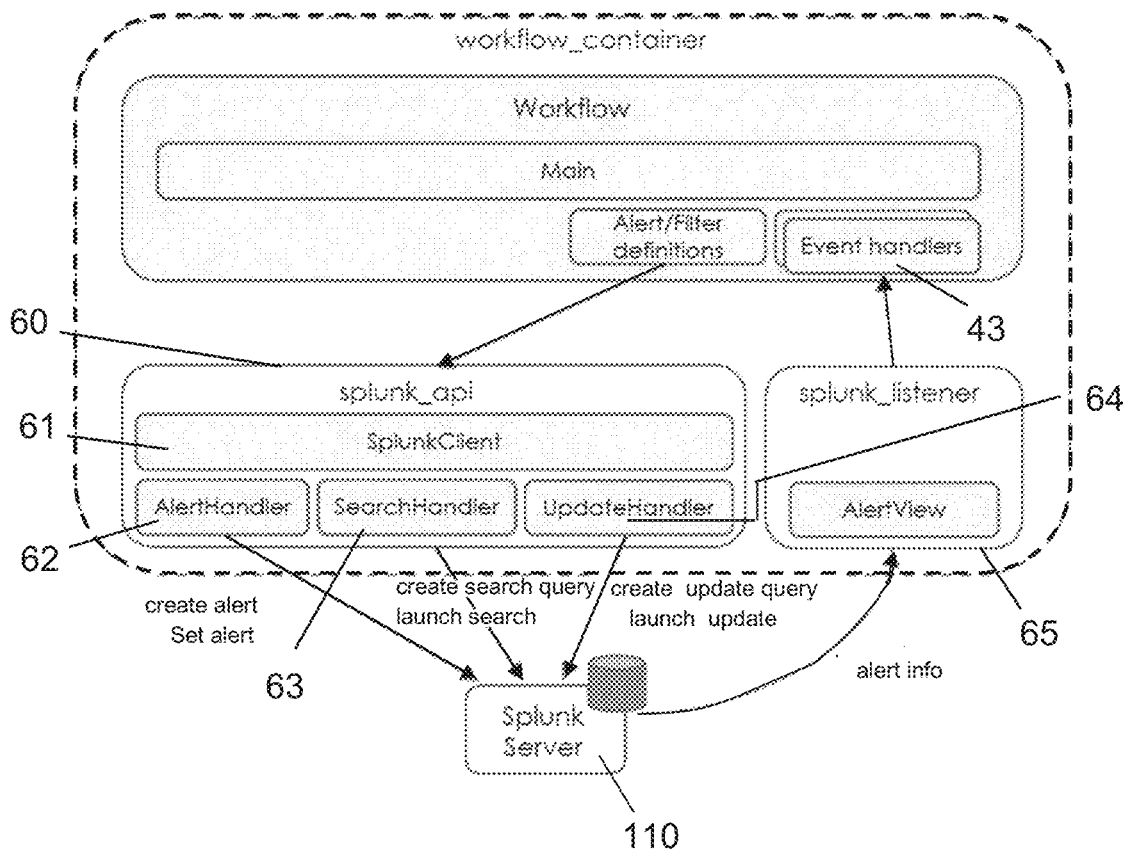
FIG. 6 illustrates the components for accessing SIEM, according to an embodiment of the invention.

FIG. 6 illustrates the components for accessing SIEM, according to an embodiment of the invention. The Splunk API 60 comprises a Splunk client 61, an Alert handler 62 for creating and setting alerts for the Splunk server 110, a search handler 63 for creating and lunching search queries and an Update handler 64 for creating and updating queries and for launching updates to the Splunk server 110. The Splunk listener 65 receives alert information from the Splunk server 110 and forwards the data to the event handlers 43.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A framework for efficiently and automatically exploring a data network and accurately identifying network threats, comprising:
   a) a plurality of software and hardware based agents, distributed over said data network, and being capable of:

a.1) adjusting or reconfiguring, on the fly, the behavior of said agents and their ability to collect data in a targeted manner, so as to investigate suspicious incidents and alerts and collect data that was not yet collected by the system;
a.2) collecting forensic data by executing tasks defined in workflows, being distributed threat intercepting programs;
a.3) reporting about the collected forensic data, back to a Central Control Unit (C&C);
b) distributed threat intercepting programs ("workflows") which provide:
b.1) instructions to deployed agents;
b.2) branches;
b.3) instructions to said Central Control Unit (C&C);
c) a Central Control Unit (C&C) for:
c.1) orchestrating said agents to assure proper execution of said workflows;
c.2) analyzing the collected information; and
c.3) presenting ongoing status to an operator supervising said data network, wherein the workflows are created according to the following steps:
d) creating initial workflows are by a domain expert, based on relevant up-to-date threat information, for executing tasks including monitoring of the network, detecting anomalies, identifying required forensic data, or performing any other designated tasks;
e) creating subsequent workflows for detecting previously unknown and undiscovered APTs, being mutations of previously known APTs, by employing the Attack Hypotheses Generation and the Workflow Generation modules; and
f) using newly found APTs to extend the pool of, from which further mutations will be created.

2. The framework according to claim 1, further comprising an Attack Hypotheses Generation module for generating a collection of attack hypotheses, by providing a set of known tools, malware types, and attack patterns that are used by an attacker, and having the highest probability during an investigated incident.

3. The framework according to claim 1, further comprising a Workflow Generation module for adapting threat intercepting procedures to the latest threat intelligence obtained from external sources, or to the likeliest attack hypotheses generated by the Attack Hypotheses Generation module.

4. The framework according to claim 1, in which the agents adapt their behavior to the emerging threats by executing instructions of different workflows.

5. The framework according to claim 1, comprising at least one processor for adjusting workflows, based on a combination of Attack Hypotheses Generation and Workflows Generation, said adjusted workflows effectively react to emerging threats in the data network.

6. The framework according to claim 1, in which the agents are configured to execute multiple tasks, depending on inspected threat.

7. The framework according to claim 1, in which the workflows include control operators such as loops and decision points, where one of a few possible steps is to be chosen.

8. The framework according to claim 1, in which tasks of a workflow are distributed to different agents, for optimizing one or more of the following criteria:
time efficiency;
balanced CPU consumption;
network traffic consumption.

9. The framework according to claim 1, in which the agents execute the various workflows in parallel, serially, or at a specific time or context as determined by a workflow execution plan.

10. The framework according to claim 1, in which workflows are represented using Python programming language and executed using RestrictedPython, in order to reduce the risk of exploits.

11. The framework according to claim 1, in which the agents are provided by a commercial of the shelf product.

12. The framework according to claim 1, in which the collected data is partially processed by the agents locally, and the results are transferred to a central repository for deeper analysis.

13. The framework according to claim 1, further comprising Security Information and Event Management (STEM) product which stores the data collected by said agents and executes a set of correlation, aggregation, and analysis rules defined in said workflows.

14. The framework according to claim 1, in which multistep attacks are handled by collecting and correlating forensic information from different locations in the network.

15. The framework according to claim 1, in which following the detection of an anomaly, anomalous events are investigated by executing relevant workflows, so as to collect forensic data, validate the event, and track down the attack path.

16. The framework according to claim 1, in which the software agents are installed on PCs and servers across the organization and secured hardware agents are connected to communication switches of the organization's network.

17. The framework according to claim 1, in which the agents are deployed independently using a "plug-and-play" mode, or be installed on existing machines of the organization.

18. The framework according to claim 1, in which the software agents are installed on PCs and servers across the organization and hardened secured hardware agents are connected to network communication switches.

19. The framework according to claim 1, further comprising cyber security plug-ins for detecting IOCs defined in attack descriptions.

20. The framework according to claim 1, in which cyber security plug-ins are one or more of the following:
anomaly detection;
IDS rules;
Signatures;
Blacklists.

21. The framework according to claim 1, in which the switch is configured by the Trusted Monitoring Orchestration module, to mirror only specific selected traffic.

* * * * *